US011480662B2

(12) United States Patent
Fu et al.

(10) Patent No.: US 11,480,662 B2
(45) Date of Patent: Oct. 25, 2022

(54) FAST-SCANNING FREQUENCY-MODULATED CONTINUOUS WAVE (FMCW) LIDAR SYSTEMS

(71) Applicant: Aptiv Technologies Limited, St. Michael (BB)

(72) Inventors: Geng Fu, Belmont, MA (US); Ali Haddadpour, Boston, MA (US); Denis Rainko, Essen (DE); Roman Dietz, Berlin (DE)

(73) Assignee: Aptiv Technologies Limited, St. Michael (BB)

( * ) Notice: Subject to any disclaimer, the term of this patent is extended or adjusted under 35 U.S.C. 154(b) by 400 days.

(21) Appl. No.: 16/788,546

(22) Filed: Feb. 12, 2020

(65) Prior Publication Data
US 2021/0247490 A1    Aug. 12, 2021

(51) Int. Cl.
*G01S 7/484* (2006.01)
*G01S 17/931* (2020.01)
(Continued)

(52) U.S. Cl.
CPC .............. *G01S 7/484* (2013.01); *G01S 17/32* (2013.01); *G01S 17/58* (2013.01); *G01S 17/931* (2020.01)

(58) Field of Classification Search
CPC .......... G01S 17/32; G01S 17/34; G01S 17/42; G01S 17/58; G01S 17/931; G01S 7/484; G01S 7/4911
See application file for complete search history.

(56) References Cited

U.S. PATENT DOCUMENTS

| 4,594,000 A | 6/1986 | Falk et al. |
| 6,606,052 B1 * | 8/2003 | Miyahara .............. G01S 13/584 342/107 |

(Continued)

FOREIGN PATENT DOCUMENTS

| EP | 2618179 | 7/2013 |
| EP | 3822658 | 5/2021 |

(Continued)

OTHER PUBLICATIONS

S. Gao, M. Osullivan, R. Hui, "Complex-optical-field lidar system for range and vector velocity measurement", Optics Express, 2012, 20, 25867-25878.

(Continued)

*Primary Examiner* — Timothy X Pham
(74) *Attorney, Agent, or Firm* — Sawtooth Patent Group PLLC

(57) ABSTRACT

The techniques of this disclosure enable lidar systems to operate as fast-scanning FMCW lidar systems. The fast-scanning lidar system alternates chirp patterns frame by frame as a way to increase scanning speed, without adding additional hardware. Each consecutive pair of frames includes a frame with a long chirp pattern with multiple chirps and a frame with a short chirp pattern with as few as a single chirp, which is derived from the long chirp pattern assuming a constant object velocity between frames. The chirp pattern applied to each pixel is consistent within each frame but different from one frame to the next. The combined duration of two consecutive frames is less than the combined duration of two consecutive frames of a traditional FMCW lidar system that uses the same chirp pattern from one frame to the next. The shorter duration increases frame rate, scanning speed, or overall throughput of the fast-scanning lidar system.

20 Claims, 9 Drawing Sheets

(51) Int. Cl.
  *G01S 17/32* (2020.01)
  *G01S 17/58* (2006.01)

(56) References Cited

U.S. PATENT DOCUMENTS

| | | | |
|---|---|---|---|
| 7,339,518 B2 | 3/2008 | Kazuma et al. | |
| 2003/0117312 A1* | 6/2003 | Nakanishi | G01S 7/35 342/107 |
| 2008/0106460 A1* | 5/2008 | Kurtz | G01S 13/34 342/99 |
| 2016/0123718 A1 | 5/2016 | Roos et al. | |
| 2016/0377721 A1 | 12/2016 | Lardin et al. | |
| 2017/0146648 A1 | 5/2017 | Lim et al. | |
| 2018/0284247 A1 | 10/2018 | Campbell et al. | |
| 2019/0018110 A1 | 1/2019 | Kremer et al. | |
| 2019/0025431 A1 | 1/2019 | Satyan et al. | |
| 2019/0086518 A1 | 3/2019 | Hallstig et al. | |
| 2019/0113602 A1* | 4/2019 | Matsumoto | G01S 7/032 |
| 2019/0361113 A1* | 11/2019 | Ray | G01S 13/58 |
| 2020/0182978 A1* | 6/2020 | Maleki | G01S 7/4817 |
| 2020/0341131 A1* | 10/2020 | You | G01S 7/0234 |
| 2021/0149031 A1 | 5/2021 | Dietz et al. | |
| 2022/0003854 A1 | 1/2022 | Delaus et al. | |

FOREIGN PATENT DOCUMENTS

| | | |
|---|---|---|
| EP | 3822659 | 5/2021 |
| WO | 2018067158 | 4/2018 |
| WO | 2018160240 | 9/2018 |

OTHER PUBLICATIONS

D. Onori, F. Scotti, M. Scaffardi, A. Bogoni, F. Laghezza, "Coherent Interferometric Dual-Frequency Laser Radar for Precise Range Doppler Measurement", Journal of Lightwave Technology, 2016, 34, 4828-4834.

S. Kakuma, "Frequency-modulated continuous-wave laser radar using dual vertical-cavity surface-emitting laser diodes for real-time measurements of distance and radial velocity", Optical Review 2017, 24, 39-46, Published online Dec. 3, 2016.

Z. Xu, L. Tang, H. Zhang, S. Pan, "Simultaneous Real-Time Ranging and Velocimetry via a Dual-Sideband Chirped Lidar", 2017, IEEE Photonics Technology Letters, 29, 2254-2257.

M. Khader, S. Cherian, "An Intorduction To Automotive Lidar", Texas Instruments Incorporated, 2018.

S. Gao and R. Hui, Frequency-modulated continuous-wave lidar using I/Q modulator for simplified heterodyne detection, Optics Letters / vol. 37, No. 11 / Jun. 1, 2012.

"Extended European Search Report", EP Application No. 21182491.7, dated Nov. 30, 2021, 9 pages.

"Extended European Search Report", EP Application No. 21183613.5, dated Dec. 2, 2021, 9 pages.

A.B. Mateo, "Applications of High Resolution and Accuracy Frequency Modulated Continuous Wave Ladar", Thesis—Montana State University, Nov. 2014.

"Extended European Search Report", EP Application No. 21152779.1, dated Jul. 15, 2021, 8 pages.

"Extended European Search Report", EP Application No. 20206998.5, dated Jul. 28, 2021, 13 pages.

"Extended European Search Report", EP Application No. 19209595.8, dated Sep. 28, 2020, 13 pages.

Baghmisheh, "Chip-scale Lidar", Jan. 19, 2017, 46 pages.

Zhang, et al., "Laser frequency sweep linearization by iterative learning pre-distortion for FMCW LiDAR", Mar. 2019, 10 pages.

* cited by examiner

FAST-SCANNING FREQUENCY-MODULATED CONTINUOUS WAVE (FMCW) LIDAR SYSTEMS

BACKGROUND

Automotive lidar systems determine speed and distance of stationary and moving targets (e.g., other vehicles, pedestrians, obstacles, other objects of interest). Frequency-modulated continuous-wave (FMCW) lidar is a promising technology for next-generation autonomous driving sensors because lidar allows for high angular resolution, strong signal to noise ratio (SNR), immunity to ambient light, and measuring range and velocity at the same time. An FMCW lidar system emits laser signals having shorter wavelengths (e.g., one to ten micrometers) than a radar system and therefore has improved Doppler frequency and angular resolution. Typically, the emitted and reflected laser signals are modulated in consecutive up and down chirps having a constant slope. Up and down beat signals can be determined due to a Doppler shift if the relative velocity is not a zero velocity. Even so, the scanning speed, and therefore frame rate, of a traditional FMCW lidar system is limited by its throughput, making the traditional lidar system a less viable sensor for some automotive applications.

SUMMARY

The techniques of this disclosure enable FMCW lidar systems to operate as fast-scanning lidar systems. A fast-scanning FMCW lidar system operates with a quicker overall frame rate without adding additional light emitting diodes (e.g., lasers) or performing complex modulations of slopes. The frequency pattern of chirps, including slopes and shapes, are consistent for each pixel within each frame, but they are different from one frame to the next. During an initial frame, each pixel within a field-of-view is scanned with a standard chirp pattern (e.g., two or more slopes and a longer chirp period), then during a subsequent frame, each pixel is scanned with a different chirp pattern, with fewer chirps or a shorter duration. The longer standard chirp pattern utilizes two or more slopes so that both range and Doppler information can be determined. Assuming a constant object velocity between the two consecutive frames, during the subsequent frame, the second chirp pattern can use fewer chirps and/or different slopes in combination with reusing part of the information obtained from the initial frame, which enables both range and range-rate (velocity) information to be determined for the subsequent frame. Therefore, the scan-time of two consecutive frames of a fast-scanning lidar system is less than the amount of time it takes to scan two consecutive frames of a traditional lidar system that repeats the same chirp pattern from one frame to the next. The shorter scan-time increases the scanning speed, which leads to improved frame rate while maintaining the capability of both distance and velocity sensing.

In some aspects, a method is described including scanning, by a FMCW lidar system of an automobile, during an initial frame of two consecutive frames and for each pixel within a field-of-view, an initial pattern of two or more chirps, determining, by the lidar system, based on the scanning of the initial pattern of the two or more chirps, a beat frequency associated with the initial frame, identifying, based on the beat frequency associated with the initial frame, object range and range-rate information associated with the initial frame. The method further includes scanning, by the lidar system, during a subsequent frame of the two consecutive frames and for each pixel within the field-of-view, a different pattern of one or more chirps, determining, by the lidar system, based on the scanning of the different pattern of the one or more chirps, a beat frequency associated with the initial frame, identifying, based on the beat frequency associated with the subsequent frame, object range and range rate information associated with the subsequent frame. The method further includes determining, based on the object range and range rate information associated with each of the initial and subsequent frames, distance and velocity for objects present in the field-of-view, and outputting, by the lidar system, the distance and velocity of the objects present in the field-of-view.

In other aspects, a lidar system is described including at least one processor or processing unit is configured to perform the above method. In additional aspects, a computer-readable storage medium is described including instructions for configuring the lidar system to perform the method above. Still, in other aspects, a system is described including means for performing the above method.

This summary is provided to introduce simplified concepts for fast-scanning FMCW lidar systems, which is further described below in the Detailed Description and Drawings. For ease of description, the disclosure focuses on automotive lidar systems; however, the techniques are not limited to automobiles but apply to lidars of other types of vehicles and systems. This summary is not intended to identify essential features of the claimed subject matter, nor is it intended for use in determining the scope of the claimed subject matter.

BRIEF DESCRIPTION OF THE DRAWINGS

The details of one or more aspects of fast-scanning FMCW lidar systems are described in this document with reference to the following drawings. The same numbers are used throughout the drawings to reference like features and components:

FIGS. 3-1 through 3-3 illustrate an example operation of a fast-scanning FMCW lidar system.

FIG. 4-1 illustrates an example transmitter and receiver of a fast-scanning FMCW lidar system.

FIG. 4-2 illustrates an example scheme implemented by a processor of a fast-scanning FMCW lidar system.

DETAILED DESCRIPTION

Figure 1:
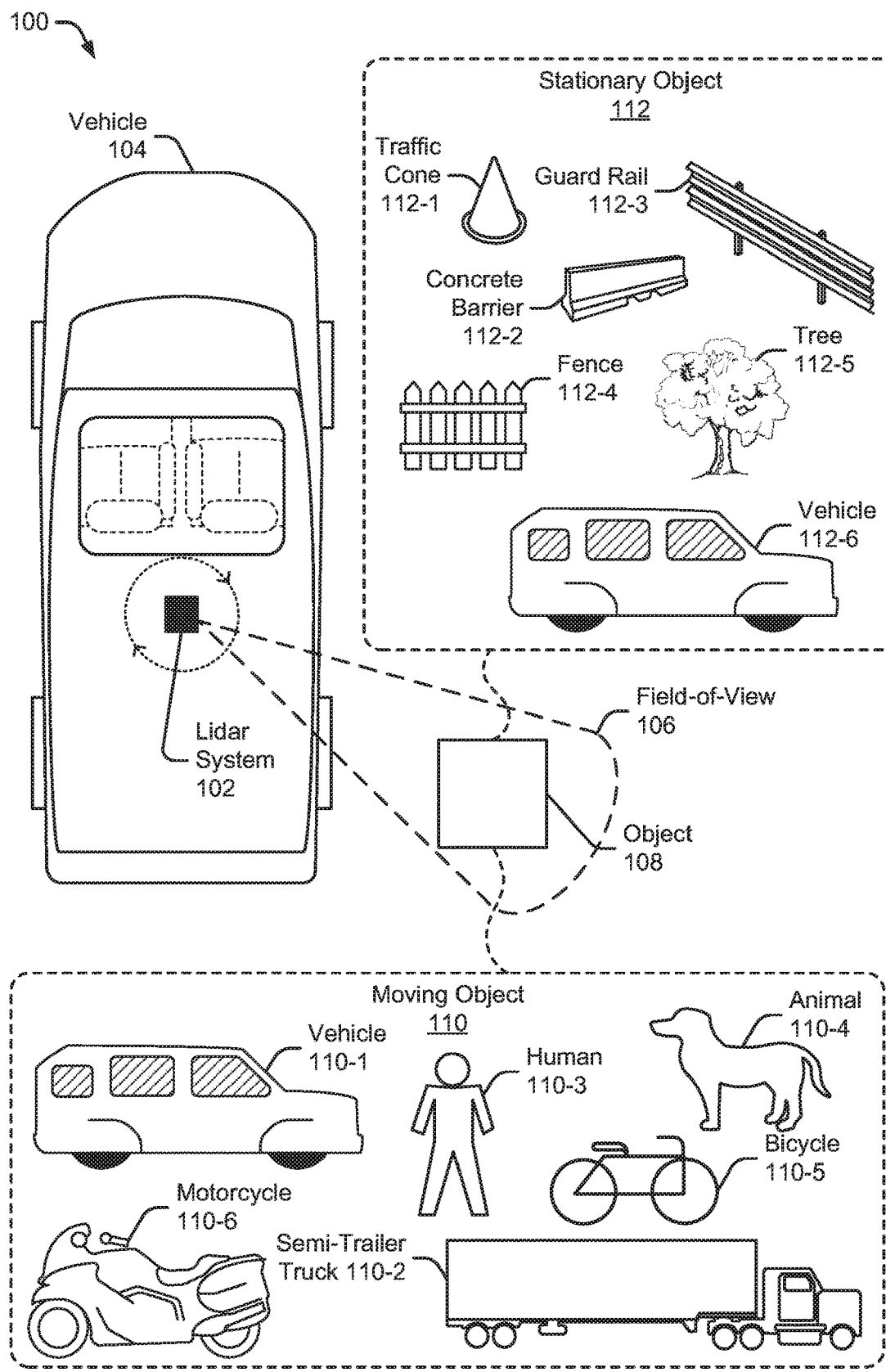
FIG. 1 illustrates an example environment in which fast-scanning FMCW lidar systems can be implemented.

The details of one or more aspects of fast-scanning FMCW lidar systems are described below. Automotive lidar systems are becoming one of the vital sensing technologies some vehicle-based subsystems rely on for acquiring critical information about an environment surrounding a vehicle. A lidar system has a field-of-view which represents a volume of space that the lidar system is looking for objects. The field-of-view is composed of a large number of pixels (roughly one million pixels). A frame represents the time it takes to complete a scan of each pixel within the field-of-view (e.g., collect information for all of the pixels). By scanning each pixel in a sequence of frames, range and range-rate (e.g., distance and velocity) of objects can be inferred. To scan each pixel, the FMCW lidar system emits a frequency-modulated laser signal with multiple chirps that alternate between positive and negative frequency-modulated slopes. Typically, the FMCW lidar system includes a delay time in each chirp to avoid chirp ambiguity. This delay varies (e.g., one to ten microseconds) based on the desired detection range. By mixing a local laser signal with signals returned from the objects, the lidar system determines the respective beat frequencies associated with the chirps. When reflected chirped signals returns to the FMCW lidar system, the reflected signals mixed with an outgoing chirped beam in a photodiode to produce a beat frequency. The beat frequencies from different chirps are decomposed into object distance or "range" and object velocity or "range-rate" for each pixel during each frame. The process repeats for each frame.

Traditionally, this process causes lidar systems to have slow scanning speeds and therefore slow frame rates, making them less suited for high-throughput applications. To combat this, some complex FMCW lidar systems included multiple lasers or lasers that perform advanced modulations to improve scanning speed. Dual-chirps in different frequency ranges or different chirping-sidebands may be implemented to reduce the scanning time at each pixel and increase the frame rate by reducing the time spent scanning each pixel. These systems require multiple lasers, a more complex readout, or other additional hardware that increases volume, weight, and cost, making them less suited for automotive applications.

The techniques of this disclosure enable existing lidar systems to operate as fast-scanning FMCW lidar systems. The system alternates chirp patterns frame-by-frame as a way to increase scanning speed and as a way to obtain a higher confidence on multiple object identification without adding additional lasers or other hardware. Each consecutive pair of frames includes an initial frame with a standard or long chirp pattern including at least two chirps with different slopes preceding a subsequent frame, which has different chirp pattern than the standard or long chirp pattern from the initial frame. The chirp pattern applied to each pixel is consistent within each frame but different from one frame to the next. The combined duration of two consecutive frames from the fast-scanning FMCW lidar system is less than the combined duration of two consecutive frames of a traditional FMCW lidar system which uses the same chirp pattern from one frame to the next. The shorter duration increases scanning speed and average frame rate of the fast-scanning lidar system.

The different chirp patterns also enable the fast-scanning FMCW lidar system to distinguish multiple objects on same pixel, but with less scanning time and/or fewer chirps. The average frame rate and therefore scanning speed is substantially improved over existing lidar systems while maintaining the capability of both distance and velocity sensing. This frame-based chirp-pattern-variation, enables more pixels to be scanned in less time and also enables multiple object identification. With the fast-scanning FMCW lidar system, another system of a vehicle (e.g., a collision avoidance system) is able to obtain lidar data more quickly so as to have a better picture of the vehicle's surroundings.

Example Environment

FIG. 1 illustrates an example environment 100 in which a fast-scanning FMCW lidar system 102 can be implemented. In the depicted environment 100, the fast-scanning FMCW lidar system 102 (referred to simply as "lidar system 102") is mounted to, or integrated within, a vehicle 104. The lidar system 102 is capable of detecting one or more objects 108 that are within proximity to the vehicle 104. Although illustrated as a car, the vehicle 104 can represent other types of motorized vehicles (e.g., a motorcycle, a bus, a tractor, a semi-trailer truck, or construction equipment), types of non-motorized vehicles (e.g., a bicycle), types of railed vehicles (e.g., a train or a trolley car), watercraft (e.g., a boat or a ship), aircraft (e.g., an airplane or a helicopter), or spacecraft (e.g., satellite). In some cases, the vehicle 104 can tow or include a trailer or other attachments. In general, the lidar system 102 can be mounted to any type of moving platform, including moving machinery or robotic equipment.

In the depicted implementation, the lidar system 102 is mounted on the roof of the vehicle 104 and provides a field-of-view 106 illuminating an object 108. The field-of-view 106 is divided into pixels. The lidar system 102 can project the field-of-view 106 from any exterior surface of the vehicle 104. For example, the lidar system 102 is integrated in a bumper, side mirror, or any other interior or exterior location where object distance and velocity requires detection. In some cases, the vehicle 104 includes multiple lidar systems 102, such as a first lidar system 102 and a second lidar system 102 that together provide a larger field-of-view. In general, locations of the one or more lidar systems 102 can be designed to provide a particular field-of-view 106 that encompasses a region of interest in which the object 108 may be present. Example field-of-views 106 include a 360-degree field-of-view, one or more 180-degree fields of view, one or more 90-degree fields of view, and so forth, which can overlap or be combined into a field-of-view of a particular sized.

The object 108 is composed of one or more materials that reflect lidar signals. Depending on the application, the object 108 can represent a target of interest or clutter. In some cases, the object 108 is a moving object 110, such as another vehicle 110-1, a semi-trailer truck 110-2, a human 110-3, an animal 110-4, a bicycle 110-5, or a motorcycle 110-6. In other cases, the object 108 represents a stationary object 112, such as traffic cone 112-1, a concrete barrier 112-2, a guard rail 112-3, a fence 112-4, a tree 112-5, or a parked vehicle 112-6. The stationary object 112 may even comprise a road barrier, which can be continuous or discontinuous along a portion of the road. The lidar system 102 and the vehicle 104 are further described with respect to FIG. 2.

In general, the lidar system 102 is different than a traditional FMCW lidar system because, unlike a traditional FMCW lidar system that uses the same triangular chirp pattern frame after frame, the lidar system 102 uses different chirp patterns between consecutive frames. The lidar system 102 is configured to scan a pattern of multiple chirps for each pixel in an initial frame of two consecutive frames before scanning a pattern of fewer chirps and/or different chirp slopes for each pixel in a subsequent frame of the two consecutive frames. The initial frame may be longer in duration than the subsequent frame because the subsequent frame can require less chirps per pixel. From the chirp pattern scanned for each pixel in the initial frame, the lidar system 102 identifies an object range and an object range-rate. The lidar system 102 reuses the Doppler-frequency determined in the initial frame for determining, from less chirps per pixel, an object range and range-rate associated with the subsequent frame. The lidar system 102 determines beat frequencies associated with each of the two frames as the basis for the object range and range rate information for each frame. The lidar system 102 outputs distance and velocity information determined from the object range and range rate information. In this way, the lidar system 102 can scan more frames in less time than a traditional lidar system that repeats the same chirp pattern frame after frame.

Figure 2:
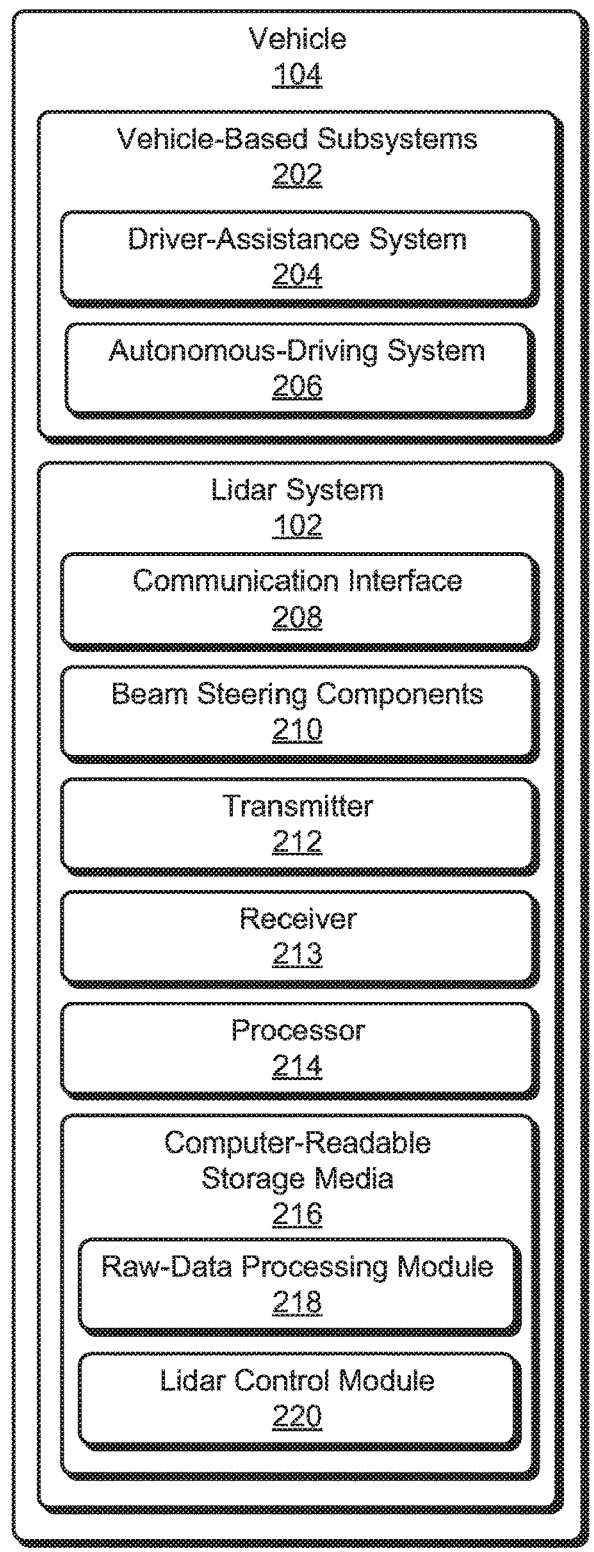
FIG. 2 illustrates an example implementation of a fast-scanning FMCW lidar system as part of a vehicle.

FIG. 2 illustrates the lidar system 102 as part of the vehicle 104. The vehicle 104 also includes vehicle-based subsystems 202 that rely on data from the lidar system 102, such as a driver-assistance system 204 and/or an autonomous-driving system 206. Generally, the vehicle-based subsystems 202 use lidar data provided by the lidar system 102 to perform a function. For example, the driver-assistance system 204 provides blind-spot monitoring and generates an alert that indicates a potential collision with an object 108 that is detected by the lidar system 102. In this case, the lidar data from the lidar system 102 indicates when it is safe or unsafe to change lanes.

As another example, the driver-assistance system 204 suppresses alerts responsive to the lidar system 102, indicating that the object 108 represents a stationary object 112, such as a road barrier. In this way, the driver-assistance system 204 can avoid annoying the driver with alerts while the vehicle 104 is driving next to the road barrier. This can also be beneficial in situations in which reflections from the road barrier generate false detections that appear to be moving objects. By suppressing the alerts, these false detections will not cause the driver-assistance system 204 to alert the driver.

The autonomous-driving system 206 may move the vehicle 104 to a particular location while avoiding collisions with other objects 108 detected by the lidar system 102. The lidar data provided by the lidar system 102 can provide information about distance and velocity of the other objects 108 to enable the autonomous-driving system 206 to perform emergency braking, perform a lane change, or adjust the vehicle 104's speed.

The lidar system 102 includes a communication interface 208 to transmit the lidar data to the vehicle-based subsystems 202 or to another component of the vehicle 104 over a communication bus of the vehicle 104, for example, when the individual components shown in the lidar system 102 are integrated within the vehicle 104. In general, the lidar data provided by the communication interface 208 is in a format usable by the vehicle-based subsystems 202. In some implementations, the communication interface 208 may provide information to the lidar system 102, such as the speed of the vehicle 104 or whether a turning blinker is on or off. The lidar system 102 can use this information to appropriately configure itself. For example, the lidar system 102 can determine an absolute speed of the object 108 by compensating for the speed of the vehicle 104. Alternatively, the lidar system 102 can dynamically adjust the field-of-view 106 based on whether a right-turning blinker or a left-turning blinker is on.

The lidar system 102 also includes a set of beam steering components 210, a transmitter 212, and a receiver 213. The beam steering components 210 may include mechanical and/or electromechanical components to shape or steer lidar signals and for detecting lidar reflections in response to the same. Using the beam steering components 210, the lidar system 102 can form beams of lidar signals that are steered and shaped through various beamforming techniques.

The lidar system 102 may be a mechanical lidar. In which case, the beam steering components 210 include high-grade optics and a rotating assembly to create a wide (e.g., three-hundred sixty degree) field-of-view. Alternatively, the lidar system 102 may be a solid-state lidar, such as a micro electrical mechanical system (MEMS) based lidar, a flash based lidar, or an optical phase array lidar. When configured as a solid-state lidar, the beam steering components 210 do not include the rotating mechanical and may therefore be less expensive than a mechanical lidar. A solid-state lidar has a reduced field-of-view. The lidar system 102 may include multiple solid-state lidar modules, with each module positioned at a different location on the vehicle 104. For example, the lidar system 102 may be on the front, rear, and/or sides of a vehicle and when fused together to create a single point cloud, the lidar system has a field-of-view that is similar to that of a mechanical lidar system.

The transmitter 212 includes circuitry and logic for emitting lidar signals via the beam steering components 210. The receiver 213 includes components necessary to identify reflections detected by the beam steering components, from the lidar signals.

The lidar system 102 also includes one or more processors 214 and computer-readable storage media (CRM) 216. The CRM 216 includes a raw-data processing module 218 and a lidar control module 220. The raw-data processing module 218 and the lidar control module 220 can be implemented using hardware, software, firmware, or a combination thereof. In this example, the processor 214 executes instructions for implementing the raw-data processing module 218 and the lidar control module 220. Together, the raw-data processing module 218 and the lidar control module 220 enable the processor 214 to process responses from the receiving beam steering components 210 in order to detect the object 108 and generate the lidar data for the vehicle-based subsystems 202.

The raw-data processing module 218 transforms raw data provided by the transmitter 212 and receiver 213 into lidar data that is usable by the lidar control module 220. The lidar control module 220 analyzes the lidar data to map one or more detections.

The lidar control module 220 produces the lidar data for the vehicle-based subsystems 202. Example types of lidar data include a Boolean value that indicates whether or not the object 108 is present within a particular region of interest, a number that represents a characteristic of the object 108 (e.g., range, range-rate, distance, velocity), or a value that indicates the type of object 108 detected (e.g., a moving object 110 or a stationary object 112). The lidar control module 220 configures the transmitter 212 and receiver 213 to emit lidar signals and detect reflections via the beam steering components 210. The lidar control module 220 outputs information associated with the lidar reflections detected from lidar signals that reach targets, such as the object 108.

Figures 1, 3:
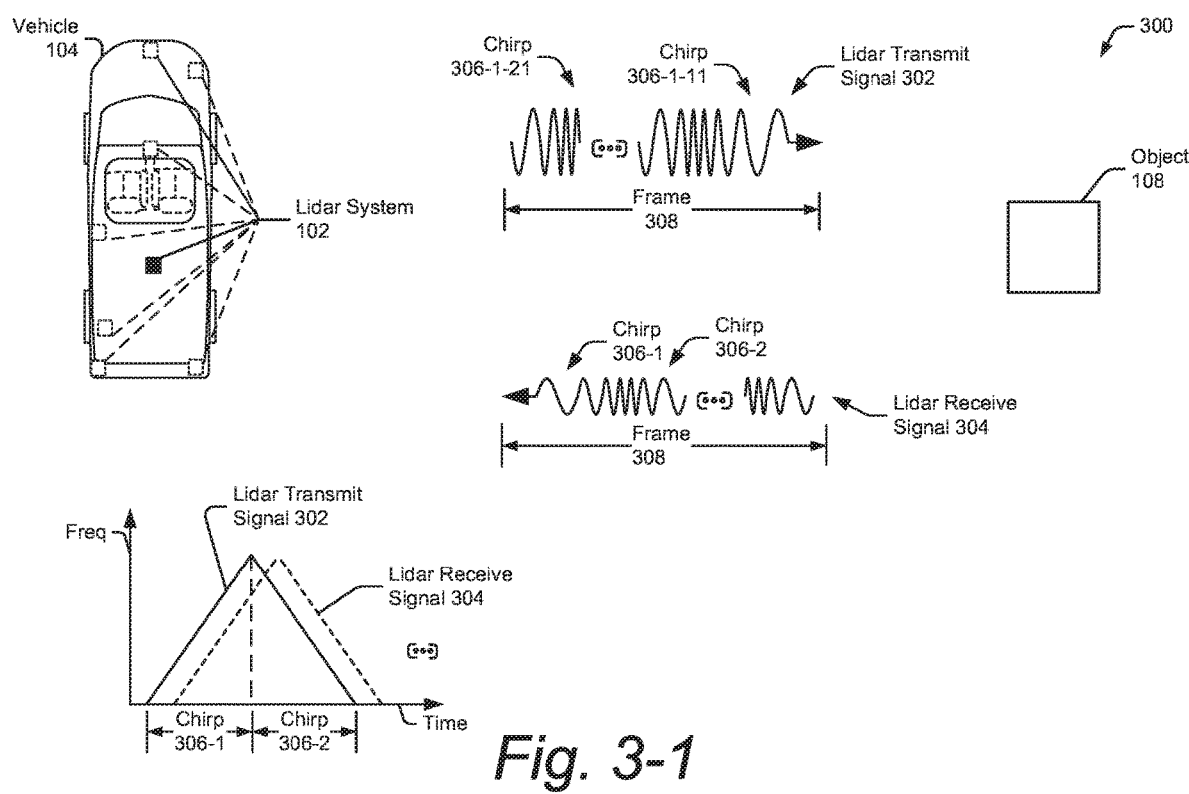
Figures 2, 3:
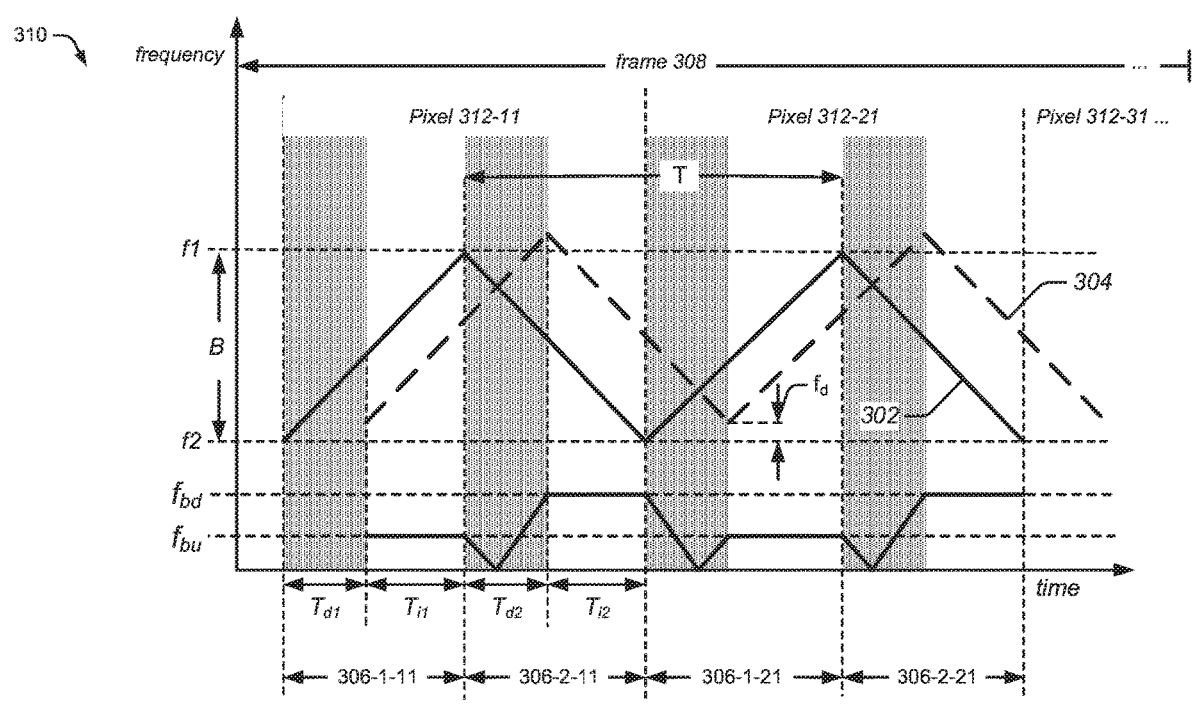
Figure 3:
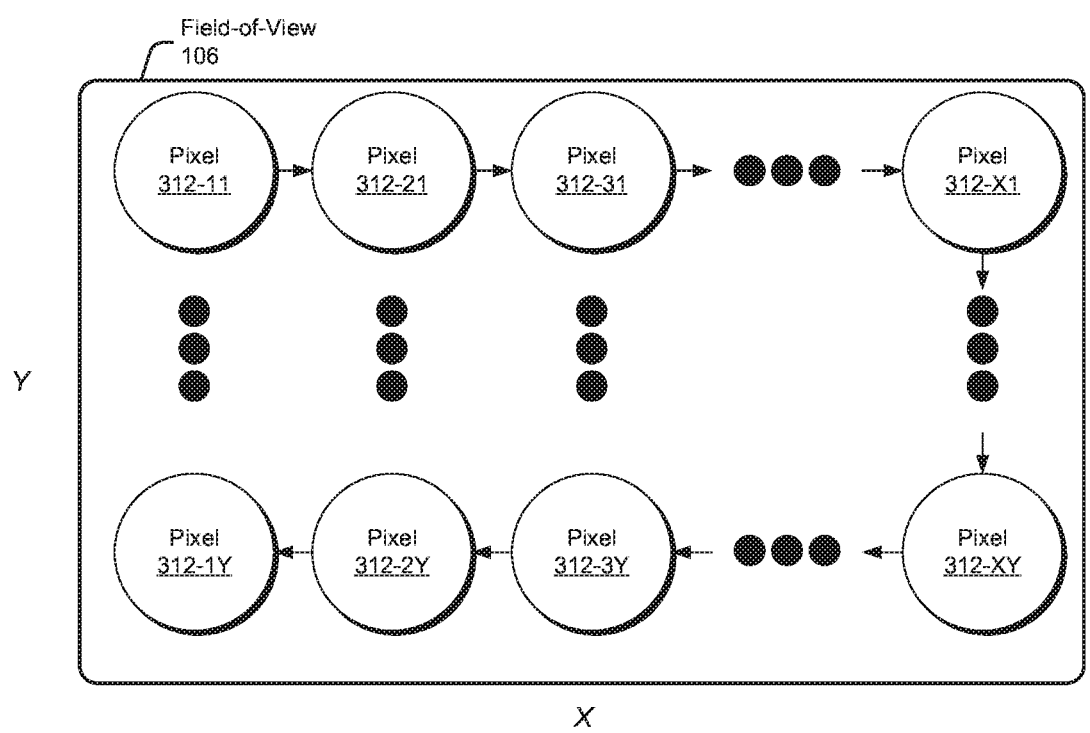

FIGS. 3-1 through 3-3 illustrate an example operation of the lidar system 102. For reference, refer to FIG. 3-3 which shows the pixels 312-11, 312-21, 312-31 . . . 312-X1, . . . , 312-XY, 312-3Y, 312-2Y, 312-1Y, and all other pixels scanned during a frame 308. The pixels 312 are shown arranged in X pixels wide by Y pixels high grid and are scanned individually in the order shown by arrows, one row (or column) at a time.

Back to FIG. 3-1, in environment 300, the object 108 is located at a particular slant range and angle from the lidar system 102. To detect the object 108, the lidar system 102 transmits a lidar transmit signal 302. At least a portion of the lidar transmit signal 302 is reflected by the object 108. This reflected portion represents a lidar receive signal 304. The lidar system 102 receives the lidar receive signal 304 and processes the lidar receive signal 304 to extract lidar data for the vehicle-based subsystems 202. As depicted, an amplitude of the lidar receive signal 304 is smaller than an amplitude of the lidar transmit signal 302 due to losses incurred during propagation and reflection.

Collectively referred to as "chirps 306", the lidar system 102 transmits the chirps 306-1-11, 306-2-11, 306-1-21, and 306-2-21 in a continuous sequence during an initial frame 308. The chirps 306 represent a scan of individual pixels 312 (not shown) within the field-of-view 106. A frame 308 represents the time it takes to scan all the individual pixels 312 within the field-of-view 106.

Each of the chirp 306 can be emitted using a laser signal with which the frequency increases (up-chirp), decreases (down-chirp), or remains constant (flat-chirp) over time. In the depicted example, the lidar system 102 employs a triangle-slope cycle, which alternates the frequency of each chirp between linearly increasing and linearly decreasing over time. In general, transmission characteristics of the chirps 306 (e.g., bandwidth, center frequency, duration, and transmit power) can be tailored to achieve a particular detection range, range resolution, or Doppler resolution for detecting the object 108.

At the lidar system 102, the lidar receive signal 304 represents a delayed version of the lidar transmit signal 302. The amount of delay is proportional to the range (e.g., distance) from the lidar system 102 to the object 108. In particular, this represents a summation of a time it takes for the lidar transmit signal 302 to propagate from the lidar system 102 to the object 108 and a time it takes for the lidar receive signal 304 to propagate from the object 108 to the lidar system 102. If the object 108 and/or the lidar system 102 is moving, the lidar receive signal 304 is shifted in frequency relative to the lidar transmit signal 302 due to the Doppler effect. In other words, characteristics of the lidar receive signal 304 are dependent upon motion of the object 108 and/or motion of the vehicle 104. Similar to the lidar transmit signal 302, the lidar receive signal 304 is composed of one or more of the chirps 306. The transmission of the lidar transmit signal 302 and the reception of the lidar receive signal 304 is further described with respect to FIG. 3-2.

FIG. 3-2 illustrates chart 310 which shows the lidar transmit signal 302 and the lidar receive signal 304 in more detail. Referring to chart 310, the vertical axis represents frequency while the horizontal axis represents time. The chart spans a single frame 308 made up of multiple pixels including pixels 312-11, 312-21, and so forth.

During the frame 308, the lidar system 102 scans the lidar receive signal 304 obtaining range and range-rate information from chirps 306-1-11 and 306-2-11 for the pixel 312-11. Then, the lidar system 102 scans the lidar receive signal 304 obtaining range and range-rate information from chirps 306-1-12 and 306-2-12 for the pixel 312-12, e.g., for quasi-simultaneous range-Doppler sensing. By mixing the laser (local or "LO") signal with the lidar receive signal 304, the lidar system 102 generates two beat frequencies, an upchirp beat frequency ($f_{bu}$) and a downchirp beat frequency ($f_{bd}$), which can then be decomposed into velocity and distance information, as presented in the following equations. For the following equations, assume R is range (distance) to an object, v is velocity (range-rate) of the object, c is the speed of light, G is the carrier frequency (the lidar transmit signal 302), T is chirp time, and B is bandwidth. Accordingly:

The Doppler frequency is:

$$f_d = 2*v*\frac{f_c}{c}$$  Eq. 1

The upchirp beat frequency is:

$$f_{bu} = \frac{2*R*B}{c*T} - 2*v*\frac{f_c}{c}$$  Eq. 2

The downchirp beat frequency is:

$$f_{bd} = \frac{2*R*B}{c*T} + 2*v*\frac{f_c}{c}$$  Eq. 3

For each chirp, and to avoid the chirp ambiguity, a delay time $T_d$ is required before integrating the lidar receive signal 304 during each chirp to determine the upchirp or downchirp beat frequency. This delay time $T_d$ is dependent on the maximum range of the lidar system 102, and thus in the range of one to ten microseconds, typically limits the scanning speed. Following the delay time $T_d$, the lidar receive signal 304 is integrated during $T_i$. The process repeats for each pixel in the frame. For example, during chirp 306-1-11, the lidar system 102 delays for a delay time $T_{d1}$ before integrating the receive signal 104 during $T_{i1}$. During the subsequent chirp, chirp 306-2-11, the lidar system 102 delays for a delay time $T_{d2}$ before integrating 104 the receive signal during $T_{i2}$. By repeating a triangular chirp pattern including frame after frame, as is done with a traditional lidar system to capture both velocity and distance information, the delay time $T_d$ limits the scanning speed at each pixel and the overall frame rate.

As will be made clear below, the lidar system 102 overcomes the traditional lidar system's limitations on scanning speed and, therefore, frame rate by applying fast-scanning techniques. The lidar system 102 alternates between using two different chirp patterns (e.g., one with two chirps and the other with one chirp) in consecutive frames in such a way as to distinguish the Doppler frequency for both frames, while reducing the scanning time for each pixel. The frame rate is substantially improved because the chirp pattern in the latter of two consecutive frames has a shorter duration than the chirp pattern in the initial of the two consecutive frames, unlike traditional lidar systems where the chirp pattern is the same frame after frame.

Figures 1, 4:
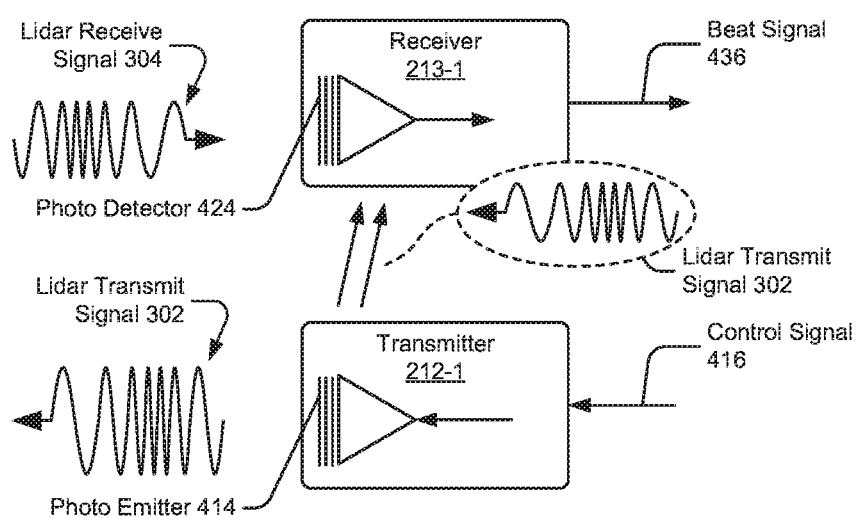
Figures 2, 4:
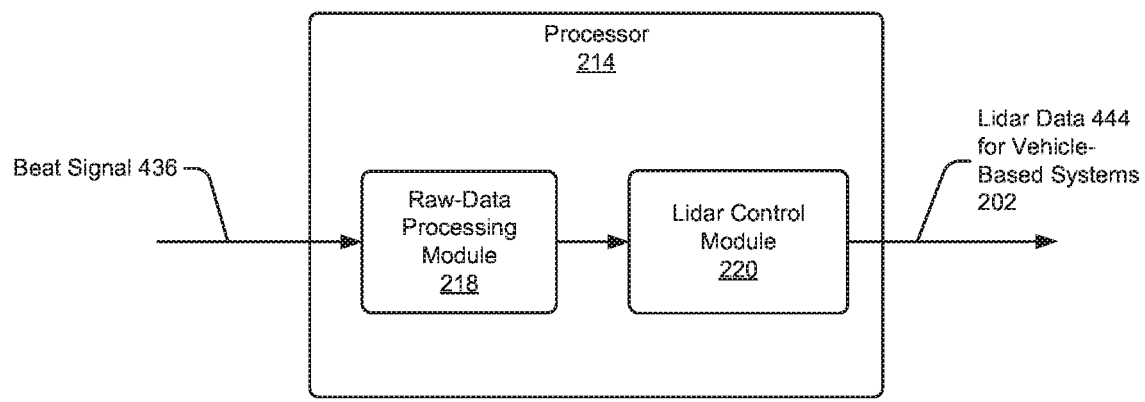

FIG. 4-1 illustrates an example transmitter 212-1 and an example receiver 213-1 of the fast-scanning FMCW lidar system 102. The transmitter 212-1 shown in FIGS. 4-1 is an example of the transmitter 212 from FIG. 2. Likewise, the receiver 213-2 is an example of the receiver 213 from FIG. 2. In the depicted configurations, the transmitter 212-1 and the receiver 213-1 are each coupled between the beam steering components 210 and the processor 214.

The transmitter 212-1 includes an emitter 414, such as a laser, among other transmit elements, and the receiver 213-1 includes a photo-detector 424, such as a Ge photodiode, among other receiver elements.

The processor 214 executes the lidar control module 220, which inputs a control signal 416 to the transmitter 212-1. In response to the control signal 416, the transmitter 212-1 outputs the transmit signal 302 using emitter 414 according to the frequency-modulation specified in the control signal 416. The photo-detector 424 detects the receive signal 304 which is output as a beat signal 436 to the raw-data processing module 218.

FIG. 4-2 illustrates an example scheme implemented by the processor 214 of the lidar system 102 for performing lidar functions. In the depicted configuration, the processor 214 implements the raw-data processing module 218, and the lidar control module 220 outputs lidar data 444 for vehicle-based subsystems 202. The processor 214 is connected to the receive channel 422.

During reception, the raw-data processing module 218 accepts the beat signal 436. The beat signal 436 represents raw or unprocessed complex lidar data. The raw-data processing module 218 performs one or more operations to generate a lidar data based on the beat signals 436. As an example, the raw-data processing module 218 can perform one or more Fourier transform operations, such as a Fast Fourier Transform (FFT) operation. Over time, the raw-data processing module 218 generates lidar data for multiple frames 308 of the lidar receive signal 304.

The raw-data processing module 218 outputs amplitude and/or phase information (e.g., in-phase and quadrature components). The lidar control module 220 analyzes information to generate lidar data 444 for the vehicle-based subsystems 202. As an example, the lidar data 444 indicates whether or not an object 108 is in a blind spot of the vehicle 104.

Figure 5:
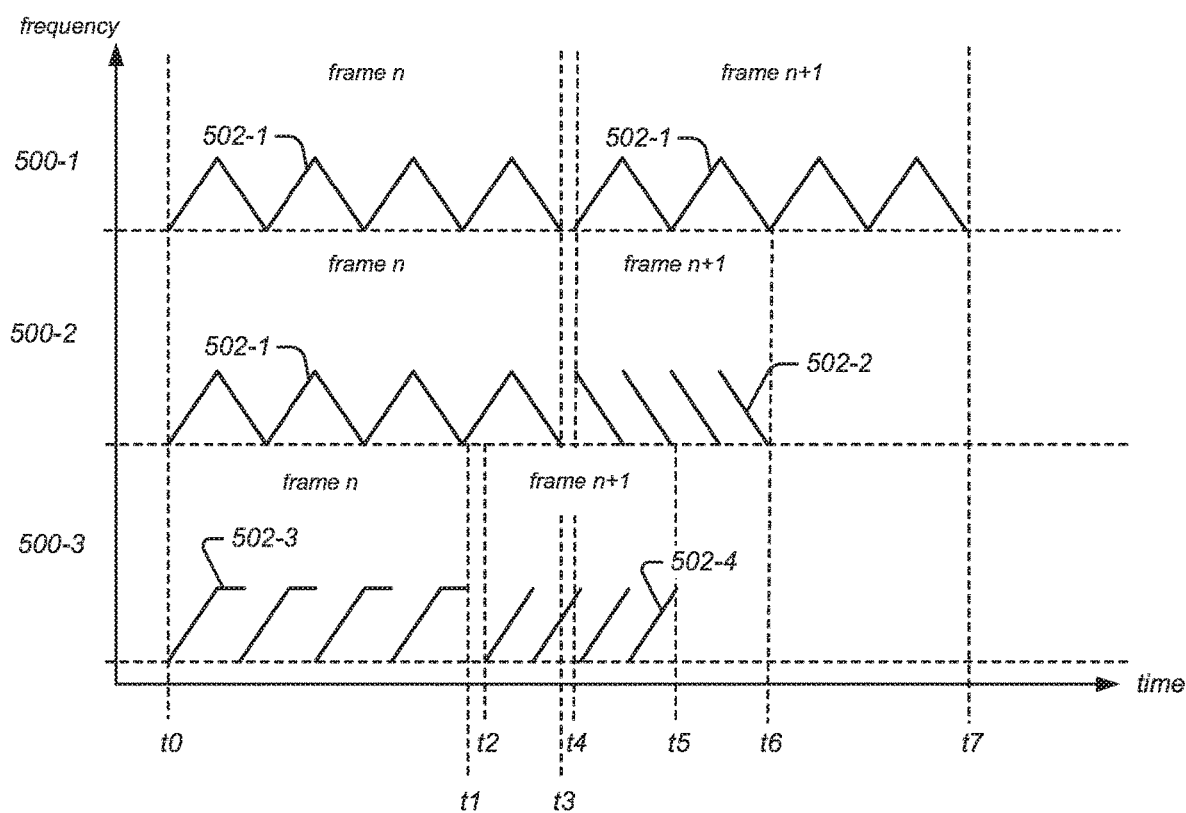
FIG. 5 illustrates example chirp patterns of a traditional FMCW lidar system juxtaposed to example chirp patterns of a fast scanning FMCW lidar system.

FIG. 5 illustrates example chirp patterns of a traditional lidar system juxtaposed to example chirp patterns of a fast scanning lidar system which relies on different chirping patterns in consecutive frames. As illustrated in the FIG. 5, the chirp patterns 502-1 through 502-4 (collectively "chirp patterns 502") are consistent for each pixel within a frame for any of the waveforms 500-1 through 500-3. However, the waveforms 500-2 and 500-3 alternate frame-by-frame between the chirp patterns 502-1 and 502-2 or 502-3 and 502-4, respectively. The velocity and distance information can be extracted from detecting and comparing the beat signals across two consecutive frames, in serial. The long chirp pattern of frame n utilizes two or more slopes so that both range and Doppler information can be determined. The object range-rate or velocity v is assumed to be constant in between these two consecutive frames n and n+1. The Doppler frequency at frame n can therefore be reused for measurements in frame n+1. Equations 1 to 3, therefore, provides velocity v, and range $R_{n+1}$ at the frame n+1.

For example, a traditional lidar system may output waveform 500-1 including chirp pattern 502-1, which is a dual chirp, triangular waveform at each pixel, from one frame to the next. The traditional lidar system scans each pixel in frame n using the chirp pattern 502-1 between times t0 and t3, and then after a short delay between frames, the traditional lidar system scans each pixel in frame n+1 using the same chirp pattern 502-1 between times t4 and t7. Having two different slopes enables the frequency shift caused by an object's range (distance) to be separated from the frequency shift caused by the object's range rate (velocity).

In contrast to a traditional lidar system, the lidar system 102 changes chirp patterns from one frame to the next as shown by waveforms 500-2 and 500-3. The lidar system 102 outputs the chirp pattern 502-1 for each pixel in frame n, just like the traditional lidar system does in waveform 500-1. However, in the subsequent frame n+1 of waveform 500-2, the lidar system 102 outputs a different chirp pattern 502-2 to scan each pixel. At each pixel, the chirp pattern 502-2 includes the chirp having different slopes from the chirp pattern 502-1. Frame n+1 in waveform 500-2 is of shorter duration than frame n+1 of waveform 500-1 because the chirp pattern 502-2 has half the quantity of chirps as the chirp pattern 502-1.

As already explained, having two different slopes enables the frequency shift caused by an object's range to be separated from the frequency shift caused by the object's range rate. With a single-slope shorter chirp pattern, like the chirp pattern 502-2, this information cannot be separated. Accordingly, the lidar system 102 relies on the Doppler information determined during the previous frame from the chirp pattern 502-1.

As another example, the lidar system 102 outputs waveform 500-3 including the chirp pattern 502-3 for each pixel in frame n and outputs the chirp pattern 502-4 for the subsequent frame n+1. At each pixel, the chirp pattern 502-3 includes an up chirp followed by a constant chirp, whereas the chirp pattern 502-4 includes the up chirp but omits the constant chirp from the chirp pattern 502-3. Frame n+1 in waveform 500-3 is of shorter duration because the chirp pattern 502-4 has half the quantity of chirps as the chirp pattern 502-3.

The change of chirp pattern frame-by-frame can be performed by the lidar control module 220, which does not require additional hardware and therefore does not increase cost or complexity. Lidar frame rate or scanning speed is however increased. Costs can be reduced by limiting the quantity of channels.

Many other kinds of waveforms are possible. For example, a first chirp pattern and a second chirp pattern can be interspersed across a single frame. For example, frame n includes a first chirp pattern for pixel 312-11 and second chirp pattern for pixel 312-12. A subsequent frame n+1 includes a second chirp pattern for pixel 312-11 and a first chirp pattern for Pixel 312-12.

Figure 6:
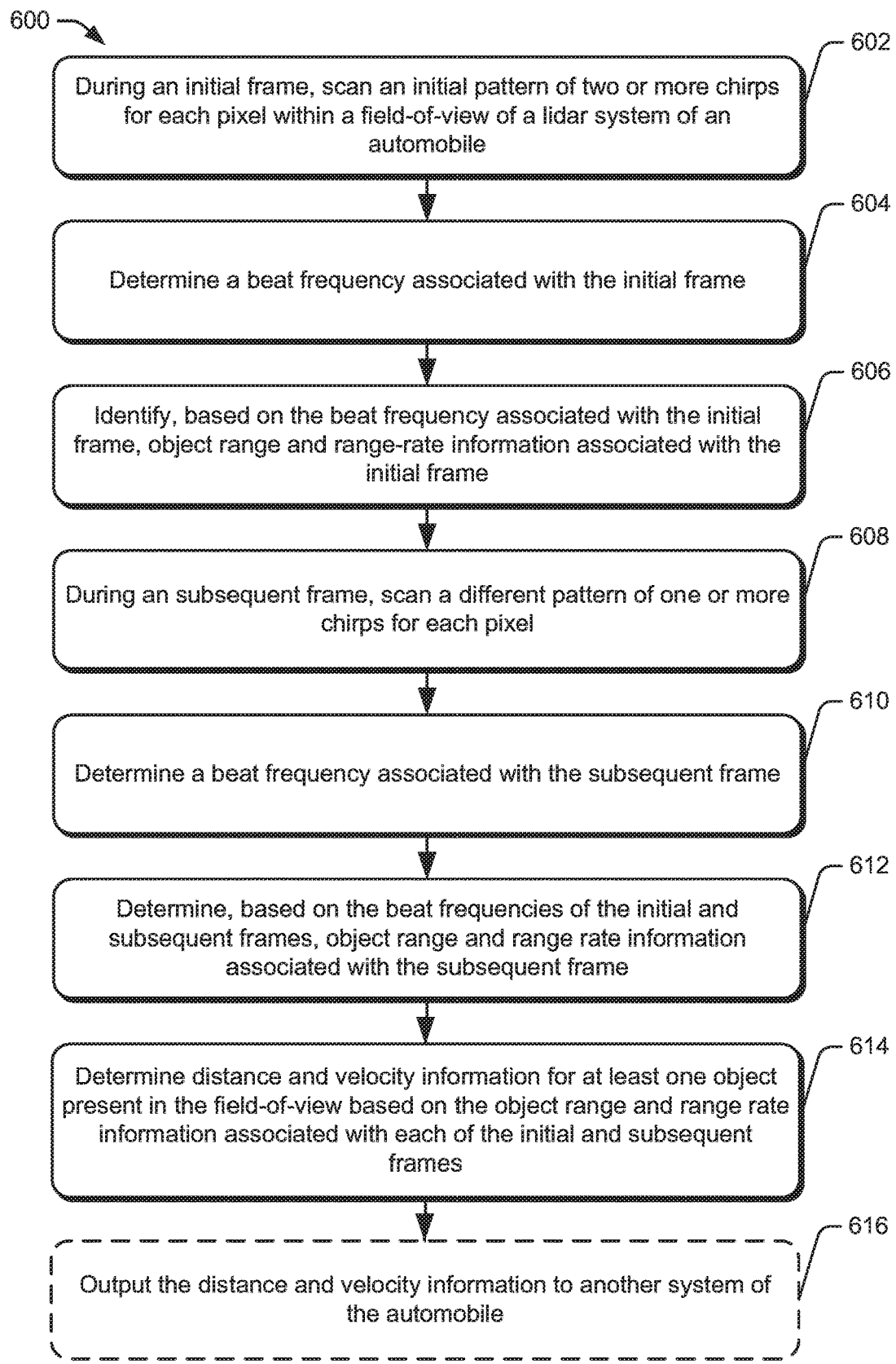
FIG. 6 illustrates an example process performed by a processor of a fast-scanning lidar system.

FIG. 6 illustrates an example process 600 performed by the processor 214 of a fast scanning FMCW lidar system 102. The process 600 may be performed including additional or fewer operations than what is shown or in a different order.

At 602, the processor 214 causes the lidar system 102 to, during an initial frame, scan an initial pattern of two or more chirps for each pixel within a field-of-view of a lidar system of an automobile. For example, the lidar system 102 may output waveform 500-1 including the chirp pattern 502-1 at each pixel in the initial frame.

At 604, the processor 214 determines a beat frequency associated with the initial frame based on the scanning of the initial pattern of two or more chirps. At 606, the processor 214 identifies object range and range-rate information associated with the initial frame based on the beat frequency associated with the initial frame.

At 608, the processor 214 causes the lidar system 102 to, during a subsequent frame, scan a different pattern of one or more chirps for each pixel with the field-of-view. For example, the lidar system 102 may output waveform 500-1 including the chirp pattern 502-2 at each pixel in the subsequent frame.

At 610, the processor 214 determines a beat frequency associated with the subsequent frame based on the scanning of the different pattern. At 612, the processor 214 identifies object range and range-rate information associated with the subsequent frame based on the beat frequency associated with the initial and the subsequent frames.

At 614, the processor 214 determines distance and velocity information for at least one object present in the field-of-view based on the beat frequency associated with the initial frame and the beat frequency associated with the subsequent frame. For example, the raw-data processing module 218 transforms the information contained in the beat signals 436 into object range and range-rate information for one or more objects in each pixel in the field-of-view 106.

The following are additional examples of fast-scanning FMCW lidar systems and applicable techniques.

Example 1: A method comprising: scanning, by a lidar system of an automobile, during an initial frame of two consecutive frames and for each pixel within a field-of-view, an initial pattern of two or more chirps; determining, by the lidar system, based on the scanning of the initial pattern of the two or more chirps, a beat frequency associated with the initial frame; identifying, based on the beat frequency associated with the initial frame, the object range and range-rate information associated with the initial frame; scanning, by the lidar system, during a subsequent frame of the two consecutive frames and for each pixel within the field-of-view, a different pattern of one or more chirps; determining, by the lidar system, based on the scanning of the different pattern of the one or more chirps, a beat frequency associated with the subsequent frame; identifying, based on the beat frequency associated with each of the initial frame and the subsequent frame, object range and range-rate information associated with the subsequent frame; determining, based on the object range and range rate information associated with each of the initial and subsequent frames, distance and velocity for at least one object present in the field-of-view; and outputting, by the lidar system, the distance and velocity of the at least one object present in the field-of-view.

Example 2: The method of example 1, wherein identifying the object information associated with the subsequent frame further comprises applying a Doppler frequency determined for the initial frame as the Doppler frequency for the subsequent frame.

Example 3: The method of example 1 or 2, wherein the initial pattern of two or more chirps comprises a pair of chirps, and the subsequent pattern of one or more chirps comprises a single chirp.

Example 4: The method of example 3, wherein the pair of chirps in the initial frame comprise a first chirp and a second chirp and the single chirp in the subsequent frame comprises a third chirp different or similar with the first chirp or the second chirp.

Example 5: The method of example 4, wherein a frequency of the first chirp increases over time and a frequency of the second chirp decreases or remains constant.

Example 6: The method of any of examples 1-5, wherein a duration of the initial frame exceeds a duration of the subsequent frame.

Example 7: The method of any of examples 1-6, wherein the distance and velocity for the objects present in the field-of-view includes distance and velocity information for a single object present a single pixel in the field-of-view.

Example 8: The method of any of examples 1-7, wherein the distance and velocity for the objects present in the field-of-view includes distance and velocity information for multiple objects present a single pixel in the field-of-view.

Example 9: The method of any of examples 1-8, wherein outputting the distance and velocity information of the at least one object present in the field-of-view comprises outputting the distance and velocity information of the object present in the field-of-view to another system of the automobile.

Example 10: A lidar system comprising: a transmitter; a receiver; and at least one processing unit configured to: direct the transmitter and receiver to scan, during an initial frame of two consecutive frames and for each pixel within a field-of-view, an initial pattern of two or more chirps; determine, based on the scanning of the initial pattern of the two or more chirps, the beat frequency associated with the initial frame; identify, based on the beat frequency with the initial frame, object range and range-rate information associated with the initial frame, a; direct the transmitter and receiver to scan, during a subsequent frame of the two consecutive frames and for each pixel within the field-of-view, a different pattern of one or more chirps; determine, based on the scanning of the different pattern of the one or more chirps, the beat frequency associated with the subsequent frame; identify, based on the beat frequency associated with the initial frame and the subsequent frame, object range and range-rate information associated with the subsequent frame; determine, based on the beat frequencies associated with the initial and subsequent frames, distance and velocity for at least one object present in the field-of-view; and output the distance and velocity of the at least one object present in the field-of-view.

Example 11: The lidar system of example 10, wherein the at least one processing unit is further configured to perform any of the methods of the examples 1-9.

Example 12: A computer-readable storage medium comprising instructions that when executed, cause the at least one processing unit of the lidar system of example 10 to perform any of the methods of the examples 1-9.

Example 13: A lidar system comprising: means for scanning, during an initial frame of two consecutive frames and for each pixel within a field-of-view, an initial pattern of two or more chirps; means for determining, based on the scanning of the initial pattern of the two or more chirps, the beat frequency associated with the initial frame; means for identifying, based on the beat frequency associated with the initial frame, object range and range rate information associated with the initial frame; means for scanning, during a subsequent frame of the two consecutive frames and for each pixel within the field-of-view, a different pattern of one or more chirps; means for determining, based on the scanning of the different pattern of the one or more chirps, the beat frequency associated with the subsequent frame; means for identifying, based on the beat frequency associated with the initial frame and the subsequent frame, object information associated with the subsequent frame; and means for determining, based on the beat frequencies associated with the initial and subsequent frames, distance and velocity for at least one object present in the field-of-view.

Example 14: The lidar system of example 13, further comprising means for performing any of the methods of the examples 1-9.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed:

1. A method comprising:
scanning, by a lidar system of an automobile, during an initial frame of two consecutive frames and for each pixel within a field-of-view, an initial pattern of two or more chirps;
determining, by the lidar system, based on the scanning of the initial pattern of the two or more chirps, a beat frequency associated with the initial frame;
identifying, based on the beat frequency associated with the initial frame, object range and range rate information associated with the initial frame;
scanning, by the lidar system, during a subsequent frame of the two consecutive frames and for each pixel within the field-of-view, a different pattern of one or more chirps, a duration of the initial frame exceeding a duration of the subsequent frame;

determining, by the lidar system, based on the scanning of the different pattern of the one or more chirps, a beat frequency associated with the subsequent frame;

identifying, based on the beat frequency associated with each of the initial frame and the subsequent frame, object range and range rate information associated with the subsequent frame;

determining, based on the object range and range rate information associated with each of the initial and subsequent frames, distance and velocity for at least one object present in the field-of-view; and outputting, by the lidar system, the distance and velocity of the at least one object present in the field-of-view.

2. The method of claim 1, wherein identifying the object range and range rate information associated with the subsequent frame further comprises applying a Doppler frequency determined for the initial frame as the Doppler frequency for the subsequent frame.

3. The method of claim 1, wherein the initial pattern of two or more chirps comprises a pair of chirps, and the subsequent pattern of one or more chirps comprises a single chirp.

4. The method of claim 3, wherein the pair of chirps in the initial frame comprise a first chirp and a second chirp and the single chirp in the subsequent frame comprises a third chirp different or similar with the first chirp or the second chirp.

5. The method of claim 4, wherein a frequency of the first chirp increases over time and a frequency of the second chirp decreases or remains constant.

6. The method of claim 4, wherein the first chirp and the second chirp have different durations.

7. The method of claim 4, wherein the third chirp is similar to the first chirp or the second chirp.

8. The method of claim 7, wherein the third chirp has a duration similar to that of the first chirp or the second chirp.

9. The method of claim 1, wherein outputting the distance and velocity information of the at least one object present in the field-of-view comprises outputting the distance and velocity information of the object present in the field-of-view to another system of the automobile.

10. A lidar system comprising:
a transmitter;
a receiver; and
at least one processing unit configured to:
direct the transmitter and receiver to scan, during an initial frame of two consecutive frames and for each pixel within a field-of-view, an initial pattern of two or more chirps;
determine, based on the scanning of the initial pattern of the two or more chirps, a beat frequency associated with the initial frame;
identify, based on the beat frequency associated with the initial frame, object range and range rate information associated with the initial frame;
direct the transmitter and receiver to scan, during a subsequent frame of the two consecutive frames and for each pixel within the field-of-view, a different pattern of one or more chirps, a duration of the initial frame exceeding a duration of the subsequent frame;
determine, based on the scanning of the different pattern of the one or more chirps, the beat frequency associated with the subsequent frame;
identify, based on the beat frequency associated with the initial frame and the subsequent frame, object range and range rate information associated with the subsequent frame;
determine, based on the object range and range rate information associated with each of the initial and subsequent frames, distance and velocity for at least one object present in the field-of-view; and
output the distance and velocity of the at least one object present in the field-of-view.

11. The lidar system of claim 10, wherein:
the initial pattern of two or more chirps comprises a first chirp and a second chirp, and the subsequent pattern of one or more chirps comprises a single third chirp, different or similar with the first chirp or the second chirp.

12. The lidar system of claim 11, wherein a frequency of the first chirp increases over time.

13. The lidar system of claim 12, wherein a frequency of the second chirp decreases or remains constant over time.

14. The lidar system of claim 11, wherein the first chirp and the second chirp have different durations.

15. The lidar system of claim 11, wherein the third chirp is similar to the first chirp or the second chirp.

16. The lidar system of claim 15, wherein the third chirp has a duration similar to that of the first chirp or the second chirp.

17. A lidar system comprising:
means for scanning, during an initial frame of two consecutive frames and for each pixel within a field-of-view, an initial pattern of two or more chirps;
means for determining, based on the scanning of the initial pattern of the two or more chirps, a beat frequency associated with the initial frame;
means for identifying, based on the beat frequency associated with the initial frame, object range and range rate information associated with the initial frame;
means for scanning, during a subsequent frame of the two consecutive frames and for each pixel within the field-of-view, a different pattern of one or more chirps a duration of the initial frame exceeding a duration of the subsequent frame;
means for determining, based on the scanning of the different pattern of the one or more chirps, the beat frequency associated with the subsequent frame;
means for identifying, based on the beat frequency associated with the initial frame and the subsequent frame, object range and range rate information associated with the subsequent frame; and
means for determining, based on the object range and range rate information associated with each of the initial and subsequent frames, distance and velocity for at least one object present in the field-of-view.

18. The lidar system of claim 17, wherein the means for identifying the object range and range rate information associated with the subsequent frame further comprises means for applying a Doppler frequency determined for the initial frame as the Doppler frequency for the subsequent frame.

19. The lidar system of claim 17, wherein the initial pattern of two or more chirps comprises a pair of chirps, and the subsequent pattern of one or more chirps comprises a single chirp.

20. The lidar system of claim 19, wherein the pair of chirps in the initial frame comprise a first chirp and a second chirp and the single chirp in the subsequent frame comprises a third chirp different or similar with the first chirp or the second chirp.

* * * * *